United States Patent [19]

Sturrus

[11] Patent Number: 5,454,504
[45] Date of Patent: Oct. 3, 1995

US005454504A

[54] APPARATUS FOR ROLL-FORMING END BUMPER FOR VEHICLES

[75] Inventor: Peter Sturrus, Grand Haven, Mich.

[73] Assignee: Shape Corporation, Grand Haven, Mich.

[21] Appl. No.: 297,142

[22] Filed: Aug. 29, 1994

Related U.S. Application Data

[60] Division of Ser. No. 12,230, Feb. 2, 1993, which is a continuation-in-part of Ser. No. 499,100, Mar. 26, 1990, Pat. No. 5,306,058.

[51] Int. Cl.$^6$ .......................... B23K 31/02; B23K 101/04
[52] U.S. Cl. .............................. 228/17; 228/17.5; 72/166
[58] Field of Search .................... 228/15.1, 17, 17.5; 72/166

[56] References Cited

U.S. PATENT DOCUMENTS

| | | | |
|---|---|---|---|
| 1,317,112 | 9/1919 | Wasson | 293/102 |
| 1,424,359 | 8/1922 | Isgrig | 293/102 |
| 1,611,156 | 12/1926 | Borresen | 293/121 X |
| 1,649,922 | 11/1927 | Paull | 219/83 |
| 1,663,424 | 3/1928 | Taylor | 293/102 |
| 1,829,638 | 10/1931 | Egler | 138/171 |
| 1,956,604 | 5/1934 | Williams | 72/206 |
| 2,077,454 | 4/1937 | Almdale | 138/171 |
| 2,817,364 | 12/1957 | Crawford | 138/171 |
| 2,880,013 | 3/1959 | Dean | 280/798 |
| 3,209,432 | 10/1965 | Cape | 29/897.2 |
| 3,212,941 | 10/1966 | O'Brien | 293/102 X |
| 3,698,224 | 10/1972 | Saytes | 72/178 |
| 3,879,073 | 4/1975 | Norlin | 293/102 X |
| 3,905,630 | 9/1975 | Cantrell | 293/102 |
| 4,010,969 | 3/1977 | Cantrell et al. | 293/102 |
| 4,069,638 | 1/1978 | Hasselqvist et al. | 52/731 X |
| 4,116,480 | 9/1978 | Crestetto | 293/102 |
| 4,160,562 | 7/1979 | Crestetto | 293/120 |
| 4,326,398 | 4/1982 | Begue | 72/193 |
| 4,481,803 | 11/1984 | Dieser | 72/150 |

(List continued on next page.)

FOREIGN PATENT DOCUMENTS

| | | |
|---|---|---|
| 445075 | 6/1927 | Germany . |
| 1237453 | 3/1961 | Germany . |
| 58-218453 | 12/1983 | Japan . |
| 59-092232 | 5/1984 | Japan . |
| 597455 | 3/1978 | U.S.S.R. . |
| 1215803 | 12/1970 | United Kingdom . |
| 1497438 | 1/1978 | United Kingdom . |

OTHER PUBLICATIONS

R. R. Golze and R. F. Kienle, "Bumper Design, Materials, and Fabrication," Jan. 1973, pp. 1–8.

*Primary Examiner*—Kenneth J. Ramsey
*Attorney, Agent, or Firm*—Price, Heneveld, Cooper, DeWitt & Litton

[57] ABSTRACT

An end bumper for vehicles constructed from a single sheet of high-tensile strength steel roll-formed to provide two side-by-side tubular sections. Each section has a front wall, an outer side wall, a rear wall, and an inner side wall, the inner side walls being spaced one from the other and connected together by a web roll-formed integrally with the inner side walls. The front walls each have extended ends overlapping and abutting the web. The extreme ends of the front walls also form an abutting juncture which is welded together and also welded to the web. The bumper has a sweep formed by a sweep-forming mechanism having curvilinear external and internal mandrels conforming to the inner configuration and outer configuration of the bumper so as to provide a passageway therebetween for receiving the bumper. The bumper is passed through the passageway while the roll-forming of the bumper takes place upstream of the mandrels. The inner mandrel is supported by an elongated member extending from the internal mandrel to a support member located where the bending of the terminal lateral ends of the sheet have not yet been completed. A cutting mechanism cuts the bumper at predetermined lengths after the sweeping of the bumper has been completed to continuously form in succession a series of bumpers during the roll-forming of the sheet.

8 Claims, 5 Drawing Sheets

U.S. PATENT DOCUMENTS

| | | | |
|---|---|---|---|
| 4,530,226 | 7/1985 | Granzow et al. | 72/171 |
| 4,714,287 | 12/1987 | Merkle | 293/102 |
| 4,744,233 | 5/1988 | Trudell | 72/150 |
| 4,838,606 | 6/1989 | Furubayashi et al. | 296/188 |
| 4,961,603 | 10/1990 | Carpenter | 293/102 |
| 5,080,410 | 1/1992 | Stewart et al. | 293/102 |
| 5,092,512 | 3/1992 | Sturrus et al. | 228/146 |

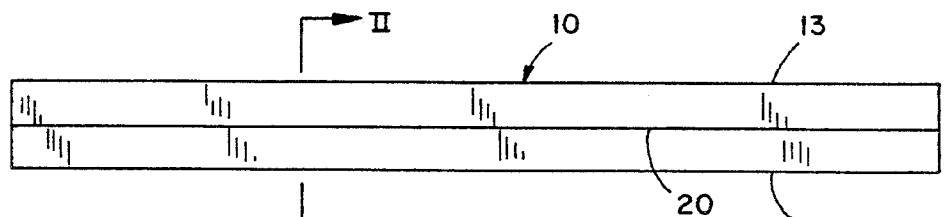
FIG. 1
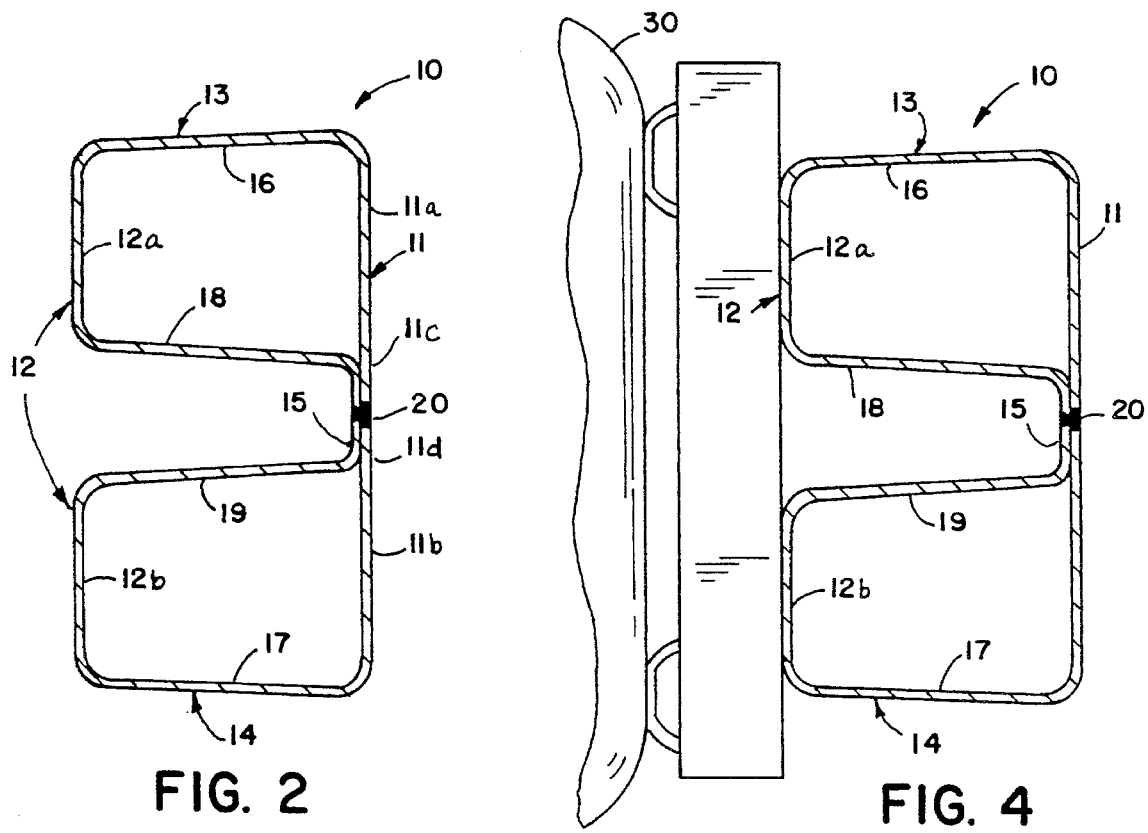
FIG. 2
FIG. 4
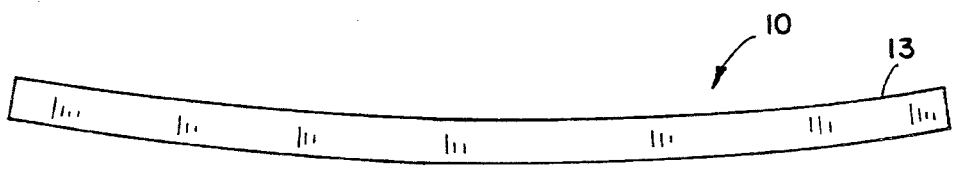
FIG. 3

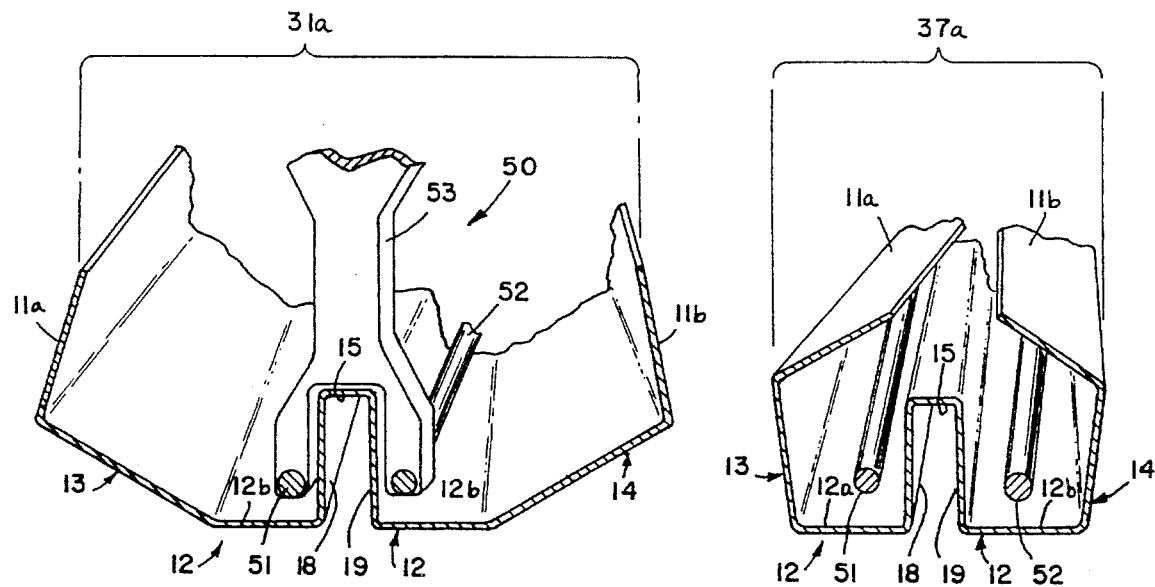
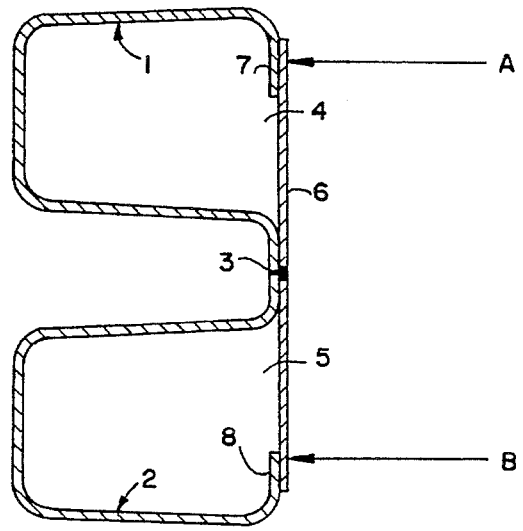
FIG. 14
PRIOR ART

APPARATUS FOR ROLL-FORMING END BUMPER FOR VEHICLES

This is a division of application Ser. No. 012,230 filed Feb. 2, 1993, which is a continuation-in-part of application Ser. No. 499,100 filed Mar. 26, 1990 and now U.S. Pat. No. 5,306,058.

AREA OF INVENTION

This invention relates to automotive bumper bars for the ends of a vehicle and more specifically a roll-formed bumper made of high strength sheet steel having a high impact resistance, low weight, and relatively low cost of manufacture.

BACKGROUND OF THE INVENTION

In my parent patent application Ser. No. 07/499,100, filed Mar. 26, 1990, and my U.S. Pat. Nos. 5,092,512 issued Mar. 3, 1992, and 5,104,026 issued Apr. 14, 1992, I disclose an automotive bumper and a method and apparatus of making such bumper of high strength steel and roll-formed into a tubular cross-section. As set forth in such application and patents, the inventions of the above said application and patents solve the problems by roll-forming a closed tubular cross-section from high strength sheet steel of at least 60 KSI and 0.100 inches maximum thickness. The forming of a closed section greatly increases the strength of the bar and allowed weight reduction by use of a reduced material thickness. The closed design also improved deflection curves by avoiding the sudden collapse experienced by traditional "C" section bumpers as the flanges gave way.

Another important aspect of those inventions is the formation of a sweep during the roll-forming process. Such sweep allows for manufacture of a bumper which will satisfy modern aerodynamic designs and also increase the strength of the bumper and improve its spring-back characteristics.

Although the bumper of the above said application and patents is a great improvement over the prior art, I have conceived of an improvement thereof which has even greater strength. In addition to the strength, it has the advantage of less cost and less weight than other prior art bumpers of similar shape such as disclosed in FIG. 14 which will be described hereinafter.

Another prior art reinforcement bar utilized in a front bumper is disclosed in FIG. 14 which discloses a W-shaped or so-called double hat shaped bumper having openings 4 and 5 covered by steel plate member 6 welded to the outer legs 7 and 8 of sections 1 and 2 and to the web 3.

The W-shaped bumper of FIG. 14 is formed by roll-forming a single sheet of metal such as steel which is cut into predetermined lengths after which the metal plate 6 of the same predetermined length is attached to the C-shaped sections as disclosed in FIG. 14.

This prior art procedure is very costly because of the handling of the parts and the separate welding which requires several operations.

The reinforcement bar of FIG. 14 also has a decided disadvantage in that a striking force applied at the edges as illustrated by arrows A and B or between the edges and web 3 causes the welded ends to be forced apart destroying the integrity of the bar.

SUMMARY OF THE INVENTION

My present invention provides an automotive bumper bar which is formed of two tubular sections connected together and roll-formed from one piece of sheet steel. This tubular bumper is formed by roll-forming into two side-by-side tubular sections, each having a front wall, an outer side wall, a rear wall, and an inner side wall. The inner side walls are spaced one from the other and connected together by a web roll-formed integrally with the inner side walls. The front walls each have extensions thereof extending over, overlapping, and abutting the web where they are welded together and to the web.

My invention provides for the single sheet of high tensile strength steel to be formed in a continuous roll-forming operation, the tubular interconnected sections thus being formed in one operation as opposed to welding a separate steel piece over the open C-shaped sections as disclosed in FIG. 14.

In accordance with a narrower but important aspect of this invention, I construct my bumper from a Martensite steel which is thinner, stronger, and thus can be of substantially less weight. When Martensite is used, the weld is formed by a forged current penetration weld which provides a stronger weld.

It will become obvious from the above description that this invention provides a bumper not only of greater strength but one which is less costly and has less weight, all of which are extremely important because of the strength and the weight requirements in the automotive industry.

BRIEF DESCRIPTION OF THE DRAWINGS

FIG. 1 is a front view of the roll-formed bumper of this invention;

FIG. 2 is a cross-sectional view taken along the plane II—II of FIG. 1;

FIG. 3 is a plan view of the roll-formed bumper of the invention illustrating the sweep of the bumper;

FIG. 4 is a sketch illustrating the relationship of the bumper with respect to the body of the vehicle;

FIG. 12 is a perspective, cross-sectional view taken along the planes XII—XII of FIG. 5;

FIG. 13 is a perspective, cross-sectional view taken along the planes XII—XII of FIG. 5; and FIG. 14 is a cross-section of a prior art reinforcement for a bumper previously referred to above.

DESCRIPTION OF THE PREFERRED EMBODIMENT

Figure 5:
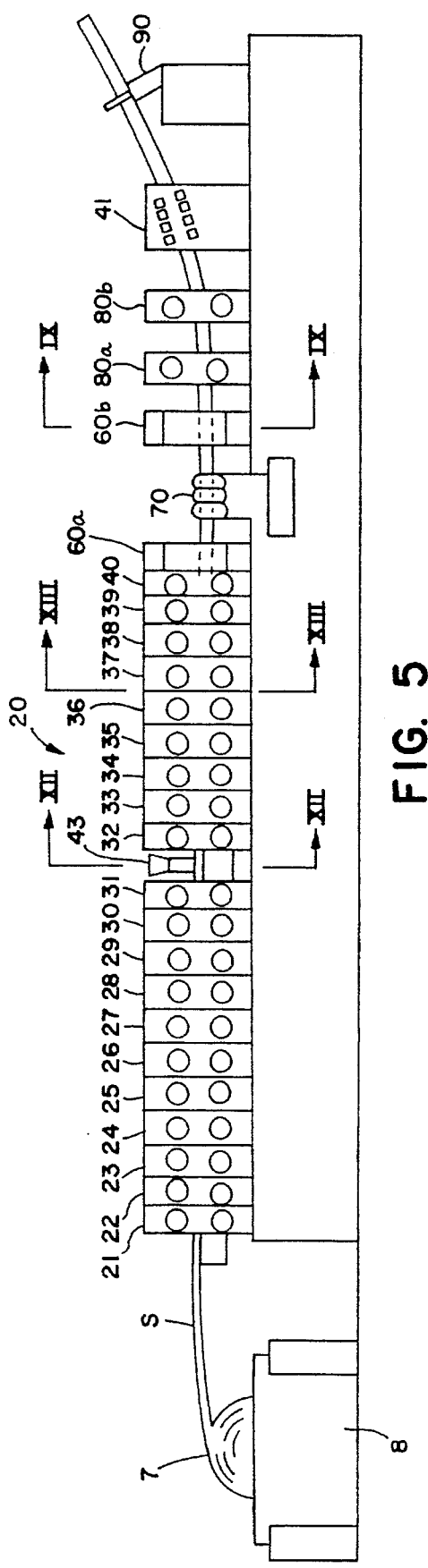
FIG. 5 is a schematic view of the roll-forming apparatus of this invention for practicing the process of this invention.
Figure 8:
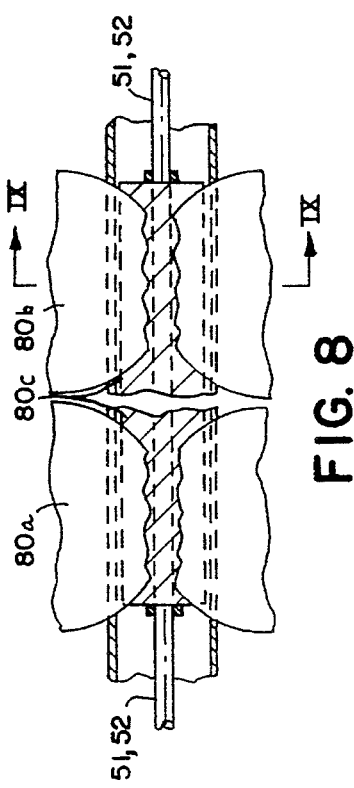
FIG. 8 is schematic of a section of a roll-forming apparatus.
Figure 7:
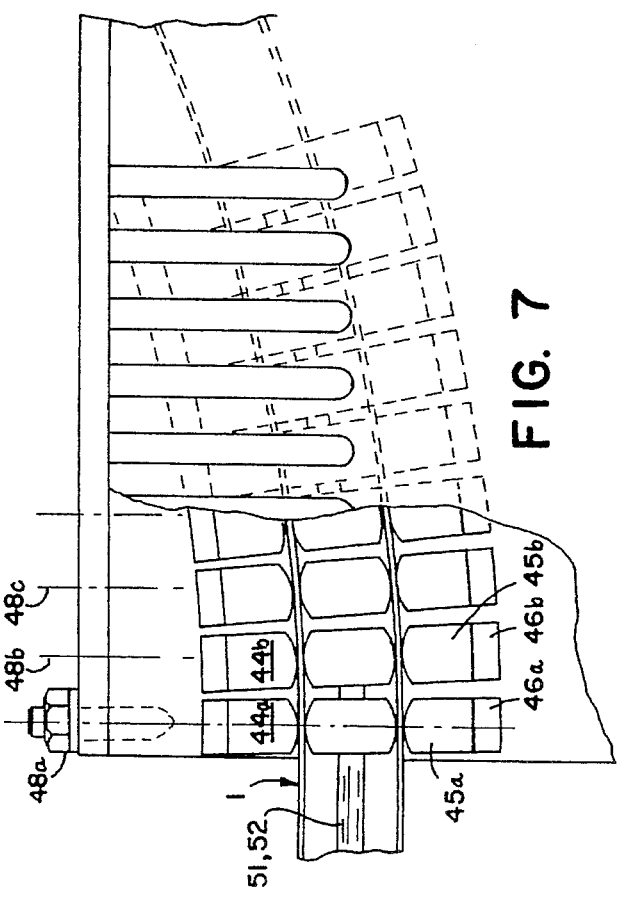
FIG. 7 is a cutaway, schematic view of the side of the sweeping means showing the sweeping mandrels and the anchoring rods.
Figure 6:
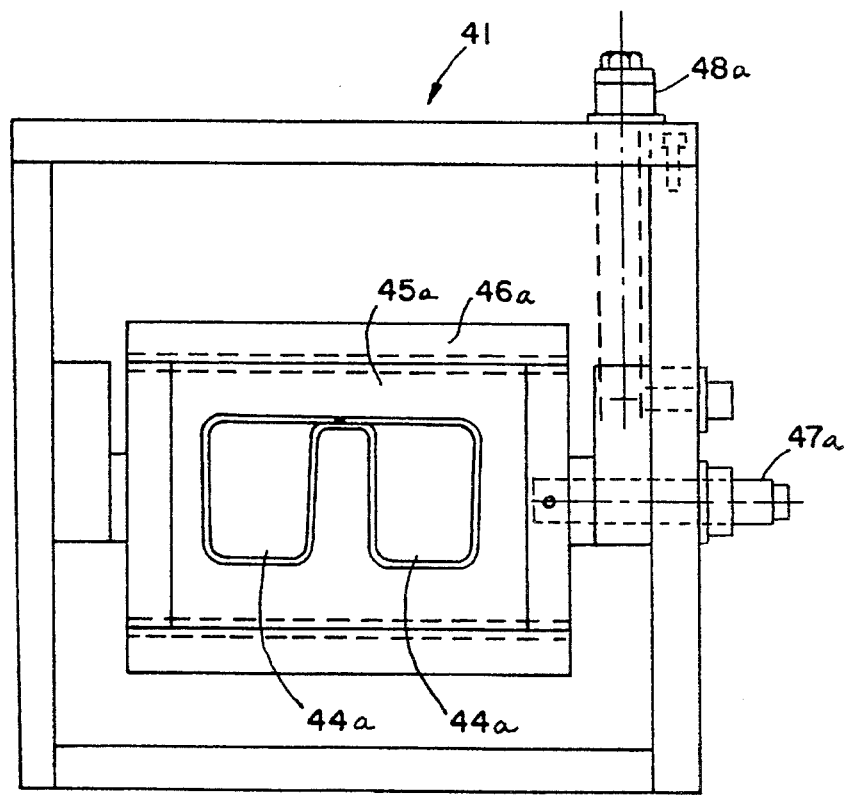
FIG. 6 is a frontal view of the sweeping station disclosing the mandrels which form the curvature in the bumper.

Referring to the drawings, FIGS. 1, 2, and 3 best disclose the bumper bar 10 of this invention having a front side 11 and a rear side 12. The bumper 10 is comprised of two tubular sections 13 and 14 connected together by the web 5. Each section has an outer side 16 and 17, respectively, and the inner sides 18 and 19, respectively. The back wall portion 12a connects the two side walls 16 and 18 of the section 13 and the back wall portion 12b connects the two side walls 17 and 19 of the tubular section 14. The wall portion 11a of the front wall 11 is connected to the side walls 16 and 18 and includes an extended end 11c that overlaps and abuts against the web 15. The wall portion 11b of the front wall 11 is connected between the side walls 17 and 19 and has an extended end 11d that also overlaps the web 15. The two extended ends 11c and 11d of the front wall abut each other and are welded to each other and to the web 15 by a forged current penetration weld 20.

As disclosed in FIG. 3, the bumper 10 has a #18 sweep. Sweep, as used in the automotive industry, is the term utilized to describe the curvature of the bumper. Measurements of sweep may be derived from charts such as disclosed in my application Ser. No. 07/499,100 filed Mar. 26, 1990, of which this application is a continuation-in-part and in my issued U.S. Pat. Nos. 5,092,512 and 5,104,026, which disclosures are incorporated by reference into this application.

Also incorporated by reference in this application, is the disclosure of different types of steel sheets suitable for the bumper as disclosed therein and the present bumper. In accordance with this invention, as in the disclosures of the above-referred to patent application and patents, it is important that the KSI range must be at least 60 KSI and can be as high as 200 KSI. In the preferred form of this invention, I prefer to use a Martensite that has a tensile strength of 190 KSI. Martensite is a low-carbon, alloy-free, cold rolled steel which is available in minimal tensile strengths ranging from 130 to 225 KSI. Due to the high Martensite start temperature, these low-carbon, alloy-free steels are auto-temperate, or self-temperate during the quench, and do not normally require tempering after quenching to avoid brittleness in high-carbon steels. Preferred results are obtained by thicknesses falling within the range of 0.035 to 0.072 inches.

FIG. 4 discloses for illustrative purposes only, a sketch showing a relationship of my bumper to a vehicle identified by the reference number 30. It will be noted that the bumper 10 is mounted on one end of the car, that is, the front or rear end with the front wall facing away from the vehicle. It is possible to reverse this position for some uses of the bumper.

Figure 10:
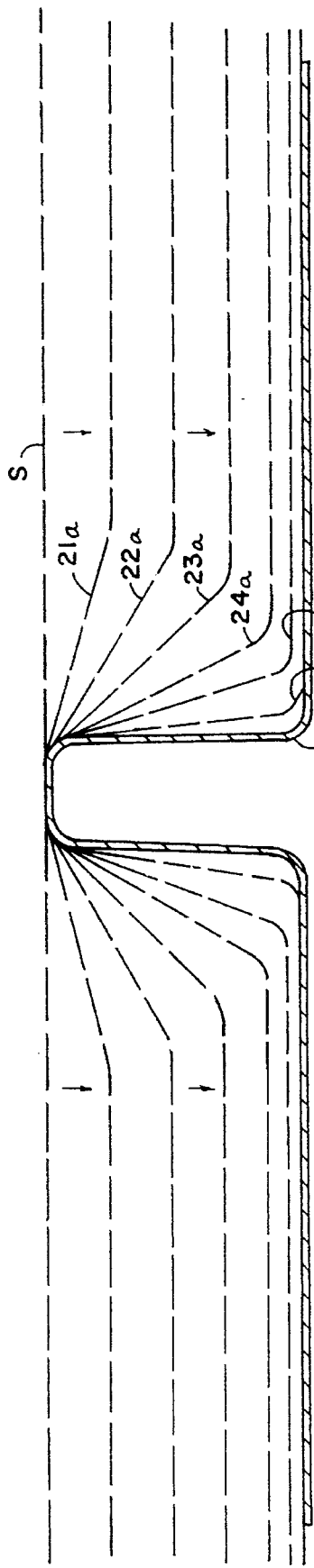
FIG. 10 is a schematic of the flow pattern of the steel sheet as the rollers progressively form the web portion of the bumper.
Figure 11:
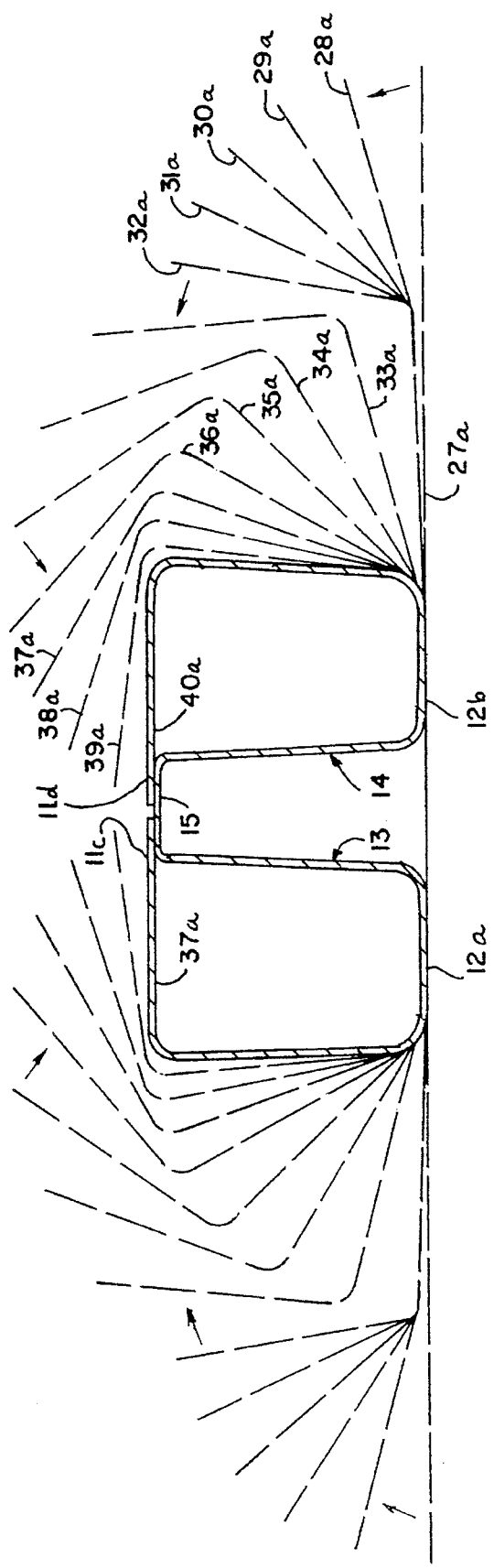
FIG. 11 discloses a continuing flow pattern of the steel sheet as the rollers form the sheet from the form disclosed in FIG. 10 to the completely formed sheet into the two tubular sections.

FIGS. 5, 6, 7, 8, and 9 disclose the apparatus for forming the bumper bar 10 of this invention and thus illustrates the process in producing the bumper or bumper bar. Referring to FIG. 5, reference numeral 20 designates the overhaul apparatus which starting from the left side of the figure, discloses a steel roll holder 8 rotatably supporting the steel roll 9 which contains a flat steel strip "S" as disclosed above and which extends into the series of roller assemblies 21, 22, 23, 24, 25, 26, 27, 28, 29, 30, 31, 32, 33, 34, 35, 36, 37, 38, 39 and 40 which have shapes that as the strip is passed therethrough, the steel is gradually and progressively formed into the form as disclosed in FIG. 2. An illustration of the progression of the forming of the steel strip is illustrated in FIGS. 10 and 11 wherein the steel strip forms 21a, 22a, 23a, 24a, 25a, 26a, etc. are respectively produced by the rollers 21, 22, 23, 24, 25, 26, etc. After passing through rollers 21–40, the formed strip S is passed through the holding rollers 60a and 60b between which is mounted the welding apparatus 70. The hold down fixtures 60a and 60b are provided, particularly when the steel strip is a 190 KSI Martensite which tends to spring back to its original form. The fixtures 60a and 60b hold the last formed edges 40a as viewed in FIG. 11 down against the web 15 and in abutting relationship with the web and with each other while the welding apparatus 70 welds the extended portions 11c and lid to each other and to the web 15. The welding apparatus 70 is of the type which produces a forged current penetration weld, particularly when the strip is a Martensite steel. It has been found that when the strip S is a Martensite steel, the forged current penetration weld is more reliable than other welds.

Although I have disclosed 20 roller assemblies to produce the shaped bar of my invention, the number can be substantially increased and under some circumstances, the number can be decreased. As disclosed in my co-pending application Ser. No. 07/499,100, a unique sweep means is provided downstream of the welder 70 and hold down fixture 60b. This sweep producing or sweeping means disclosed in FIGS. 5, 6, 7, 8, 9, 12, and 13 comprises a sweeping box 41 which includes a series of pairs of internal and external mandrels (44a and 45a, 44b and 45b, etc.) between which the tube formed by the rollers 23–37 and welded by welder 40 pass. These mandrels have rounded ends as disclosed to assist in guiding the dual tube 10 between them. Each external mandrel is held by a mandrel frame such as 46a (FIGS. 6 and 7) which is anchored at a horizontal center point by stabilizer 47a. The sweep of the bumper may be increased by vertical adjustment of the sweep adjustors 48a, 48b, 48c, etc. For example, as sweep adjustor 48a is adjusted upward, stabilizer 47a is also raised, thus forcing frame 46a and external mandrel 45a upwardly. Obviously, internal mandrel 44a is forced to follow this movement since a cross-sectional shape of the internal mandrels 44a, 44b, etc. are substantially identical to the cross-section of the bumper 10. Therefore, as a roller formed tube or bumper passes therethrough, it assumes a curvature or sweep determined by the position of mandrels.

The internal mandrels are supported by support assembly 50 (FIG. 12) which includes two rods 51 and 52 extending from and secured to the support 53. The location of the support 53 is selected to a position where the support 53 and extend downwardly into the tube as illustrated by FIG. 12. In this position, the steel strip has been rolled to form 31a (FIG. 11). The center section formed by the web 15 and inner sides 18 and 19 has been formed along with the back portions 12a and 12b. This leaves an opening through the top of the bumper being formed for receiving the fork-shaped support 53 to which rods 51 and 52 are secured.

Figure 9:
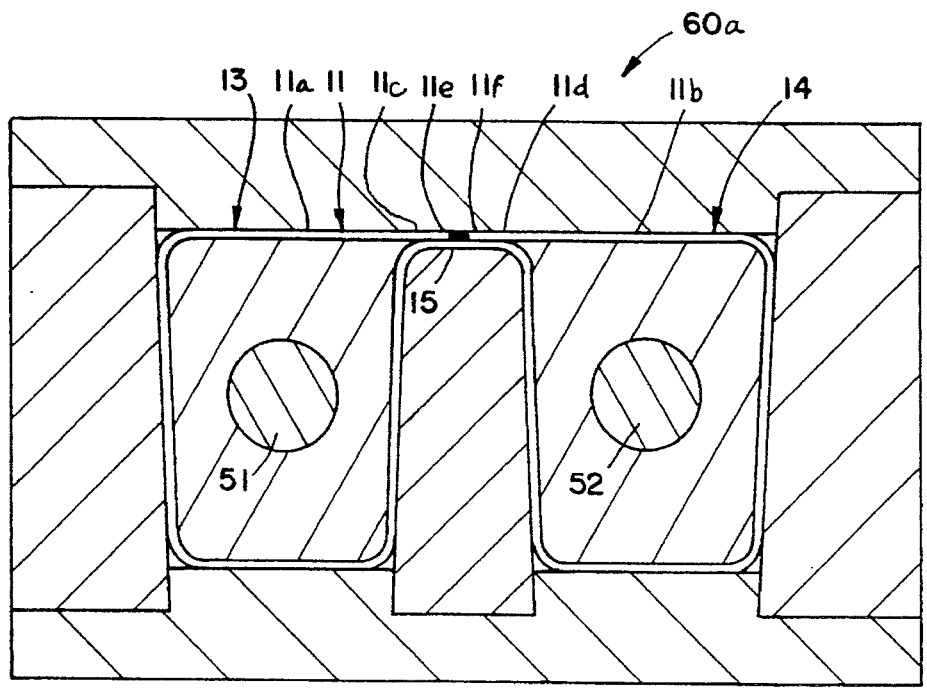
FIG. 9 is a cross-sectional view taken along the plane IX—IX of FIG. 4.

As previously disclosed, downstream of the support 53, the steel strip continues to pass through the rollers until such time that it reaches the form as disclosed in FIG. 9 which discloses the dual tube bumper formed to the desired shape with the edges of the extended portions 11c and 11d abutting and such extensions overlapping and abutting the connecting web 15 which connects the two tubular sections 13 and 14. FIG. 9 discloses the holding fixture 60a. Identical holding fixtures 60a and 60b, are located on each side of the welder 70 for the purpose of holding the formed strip or bumper when being welded in the position as shown in FIG. 9. As previously described, this is necessary in order to account for the tendency of the two portions 11a and 11b of the front 11 of the bumper from springing apart while the welding operation is taking place.

After being welded, the tube then continues through pushing rollers 80a and 80b which are configurated the same as the configuration of the bumper 10 so as to push against the internal mandrels 80c which are similar in shape to the inside cross-section of the tubular sections of the bumper such as disclosed in FIG. 9. This allows rollers 80a and 80b to generate sufficient force to force bumper bar 1 into the sweeping box 41 without crushing or deforming the cross-section of the bumper 10.

The cross-sectional shape of the bumper 10 provides a means for moving the bumper over the mandrels 44a, 44b, etc. and between such mandrels and the outer mandrels 45a, 45b, etc. Thus, as the bumper is pushed through the sweeping box 41, it is given a sweep depending upon the adjustment of the positions of the mandrels 44a, 44b, 45a, and 45b etc.

OPERATION

Having described the apparatus for forming the bumper, it should be realized that the steel strip S is paid off from roll 7 and passed through the roll assemblies to form the dual tube bumper 1 as disclosed in FIG. 9 with the edges of the front wall extensions 11c and 11d abutting each other and such extensions overlaying and abutting the web 15. In this position, the welder 70 forms the welded seam 30 to form a unitary, integral tube 10 as disclosed in FIG. 6, the tube thus formed being straight.

As in my co-pending application Ser. No. 07/499,100, it is within the contemplation of the broader aspects of this invention that the bumper thus formed can be utilized as a straight bumper having substantially improved characteristics. It has a substantially higher level of strength and damage resistance so as to meet consumer expectation and government regulation concerning low speed vehicular impact. It also has low weight to minimize vehicular dead weight and low manufacturing costs. The high strength-to-weight ratio and ease of manufacture contribute to the superiority of the present bumper. Such superiority is made possible by forming a bumper of a high strength sheet steel, with lower than normal thickness, roll-formed as disclosed above from a single strip of steel.

In accordance with the preferred more narrow aspects of this invention, the bumper formed by the roller assemblies and welder is curved or swept to produce a bumper having a sweep of from #0–60. Such curvature or sweep is produced by passing the bumper from the induction welder over the curved mandrel pairs 44a, 44b, etc. and 45a, 45b, etc., it being understood that one or more mandrels can be used. After the sweep is formed, the bumper bar 10 is cut off by the cut-off apparatus 90 (FIG. 5).

Although I have disclosed a preferred embodiment of this invention, it should be understood that many variations can be made without departing from the spirit and scope of this invention.

The embodiments of the invention in which an exclusive property or privilege is claimed are defined follows:

1. Apparatus for forming a bumper bar for a vehicle comprising a source of steel sheet for continuously providing a sheet of steel of a predetermined width;

a roll former having driven rollers for continuously roll-forming said sheet of high tensile strength steel;

said rollers including a first set of rollers for first forming a web in the longitudinal center section of said sheet and forming two inner side walls extending from said web, said web being located on a predetermined plane;

said rollers including a second set of rollers located downstream of said first set of rollers for bending said sheet at the outer ends of said inner side walls to form first walls extending away from said inner side walls and substantially parallel to said predetermined plane;

said rollers including a third set of rollers located downstream of said second set of rollers for bending the terminal lateral ends of said sheet in a direction toward said plane to form outer side walls and for bending said ends to form second walls located on said plane and having extensions overlapping and abutting said web;

a holder for holding said outer wall and said extension ends of said second wall in a position where said extensions overlap and abut said web; and a welder for welding said extensions to said web while said holder holds said extension ends in overlapping/abutting position over and on said web thereby forming a one-piece bumper having side-by-side tubular sections connected together by said web.

2. The welder of claim 1 in which the third set of rollers during the bending of the terminal lateral ends of said sheet causes the ends of said extensions to abut each other.

3. The apparatus of claim 2 in which the welder welds said abutting ends together and to said web.

4. The apparatus of claim 3 in which the welder is a forged current penetration welder.

5. The apparatus of claim 1 in which the welder is a forged current penetration welder.

6. Apparatus for forming a bumper bar for a vehicle comprising a source of steel sheet for continuously providing a sheet of steel of a predetermined width;

a roll former having driven rollers for continuously roll-forming said sheet of high tensile strength steel;

said rollers including a first set of rollers for first forming a web in the longitudinal center section of said sheet and forming two inner side walls extending from said web, said web being located on a predetermined plane;

said rollers including a second set of rollers for bending said sheet at the outer ends of said inner side walls to form first walls extending away from and substantially parallel to said predetermined plane;

said rollers including a third set of rollers for bending the terminal lateral ends of said sheet in a direction toward said plane to form outer side walls and for bending said ends to form second walls located on said plane and having extensions overlapping and abutting said web;

a holder mechanism for holding said outer walls and said extension ends of said second walls in a position where said extensions overlap and abut said web;

a welder for welding said extensions to said web during said holding step to form a one-piece bumper having side-by-side tubular sections connected together by said web;

a sweep forming mechanism having curvilinear external mandrels conforming to the outer configuration of said bumper and curvilinear internal mandrels conforming to the inner configuration of each of said tubular sections, said external and internal mandrels being spaced from each other to provide a passageway therebetween for receiving said bumper therebetween;

drive rollers for forcing said bumper through said passageway while the roll-forming by said sheet of steel upstream of said external and internal mandrels takes place;

a support means for continuously supporting the external and internal mandrels in stationary positions during the roll-forming of said sheet steel, the support for the internal mandrel including elongated members extending from said internal mandrel means to a support member, said support member being located upstream of said sweep forming means where the bending of the terminal lateral ends of said sheet has not been completed thereby providing an opening through which said support member extends for attachment to said elongated member;

said step of passing said bumper through said passageway producing a predetermined sweep in said bumper as determined by the longitudinal shape of said passageway; and a cutter for cutting said swept integral bumper at predetermined lengths after the sweeping of the bumper has been completed whereby said apparatus continuously forms in succession a series of bumpers during the roll-forming of said sheet upstream of said sweep forming mechanism.

7. The apparatus of claim 6 in which a second internal mandrel means is provided upstream of said internal and external mandrels, said second internal mandrel means conforming to the cross-sectional inner shape of said integral dual tubes whereby said integral dual tube can pass over said second mandrel means and is supported thereby, said second internal mandrel means being located at said drive rollers; said drive rollers engaging said integral bumper whereby said integral bumper is located between said drive rollers and said internal mandrel thereby causing said integral bumper to be advanced to and through said sweep forming mechanism.

8. The apparatus of claim 7 in which said second internal mandrel means is also supported by said support member.

* * * * *

UNITED STATES PATENT AND TRADEMARK OFFICE
CERTIFICATE OF CORRECTION

PATENT NO. : 5,454,504
DATED : October 3, 1995
INVENTOR(S) : Peter Sturrus

It is certified that error appears in the above-indentified patent and that said Letters Patent is hereby corrected as shown below:

Column 3, line 9;

"5." should be --15.--.

Column 4, line 13;

"lid" should be --11d--.

Signed and Sealed this

Seventh Day of May, 1996

Attest:

BRUCE LEHMAN

*Attesting Officer*    Commissioner of Patents and Trademarks

UNITED STATES PATENT AND TRADEMARK OFFICE
CERTIFICATE OF CORRECTION

PATENT NO. : 5,454,504
DATED : October 3, 1995
INVENTOR : Peter Sturrus

Page 1 of 2

It is certified that error appears in the above-identified patent and that said Letters Patent is hereby corrected as shown below:

Claim 6, column 6, line 67;

"by" should be --of--.

Signed and Sealed this

Thirteenth Day of May, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,454,504
DATED : October 3, 1995
INVENTOR(S) : Peter Sturrus

It is certified that error appears in the above-indentified patent and that said Letters Patent is hereby corrected as shown below:

In Column 11, line 43, after electrode delete the ":" and insert a -- ; --;
In Column 12, line 10, after "selected" delete the -- - --;
In Column 12, line 47, change the word "alma" to -- alumina --.

Signed and Sealed this

Thirteenth Day of May, 1997

Attest:

Attesting Officer

BRUCE LEHMAN

Commissioner of Patents and Trademarks